March 13, 1962

G. W. SADELL 3,025,378

HEAT SEALING DEVICE HAVING PORCELAIN HEAT SURFACE

Filed Sept. 22, 1959

INVENTOR.
George W. Sadell,
BY Paul & Paul
ATTORNEYS.

March 13, 1962 G. W. SADELL 3,025,378
HEAT SEALING DEVICE HAVING PORCELAIN HEAT SURFACE
Filed Sept. 22, 1959 3 Sheets-Sheet 2
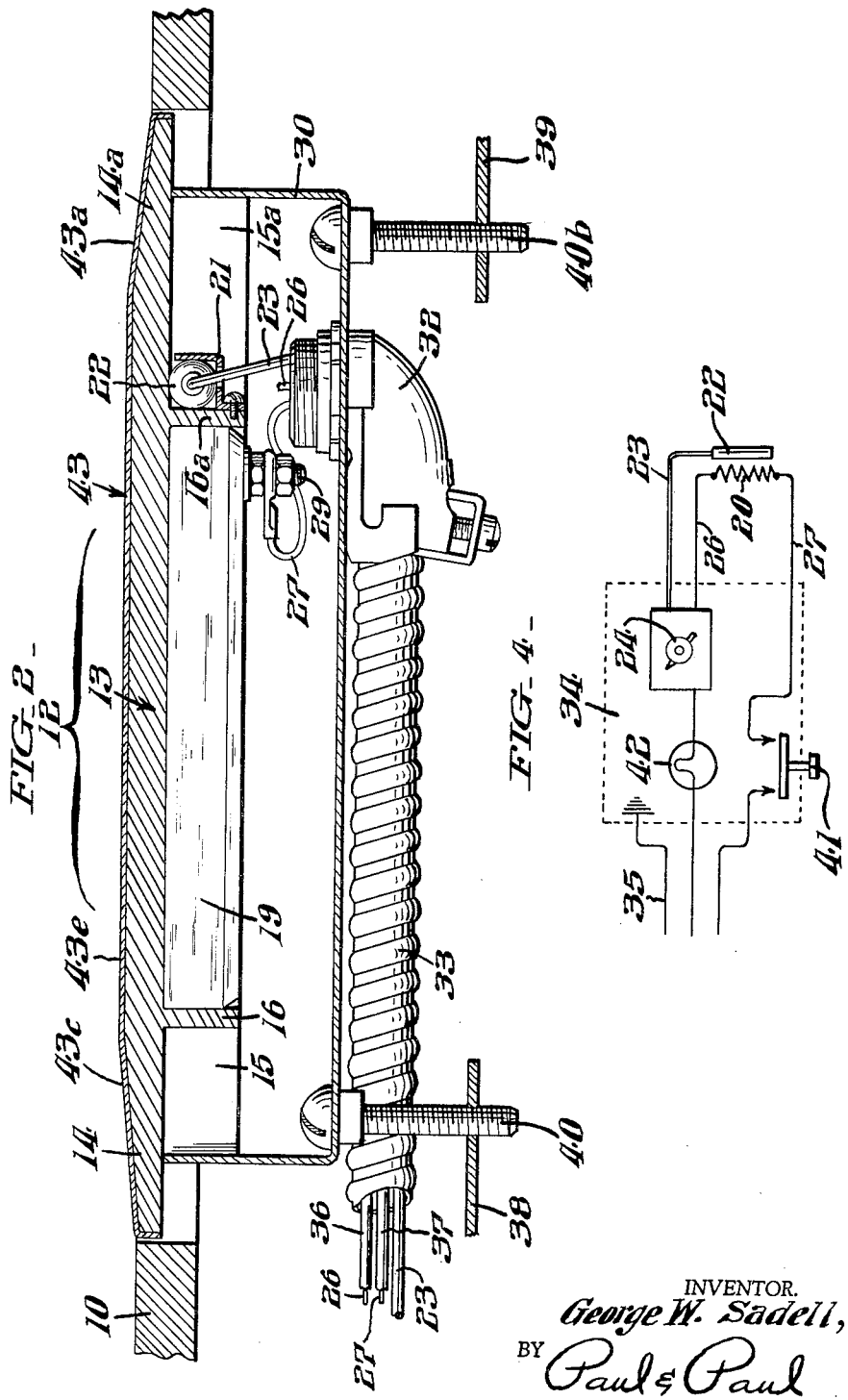
INVENTOR.
George W. Sadell,
BY Paul & Paul
ATTORNEYS.

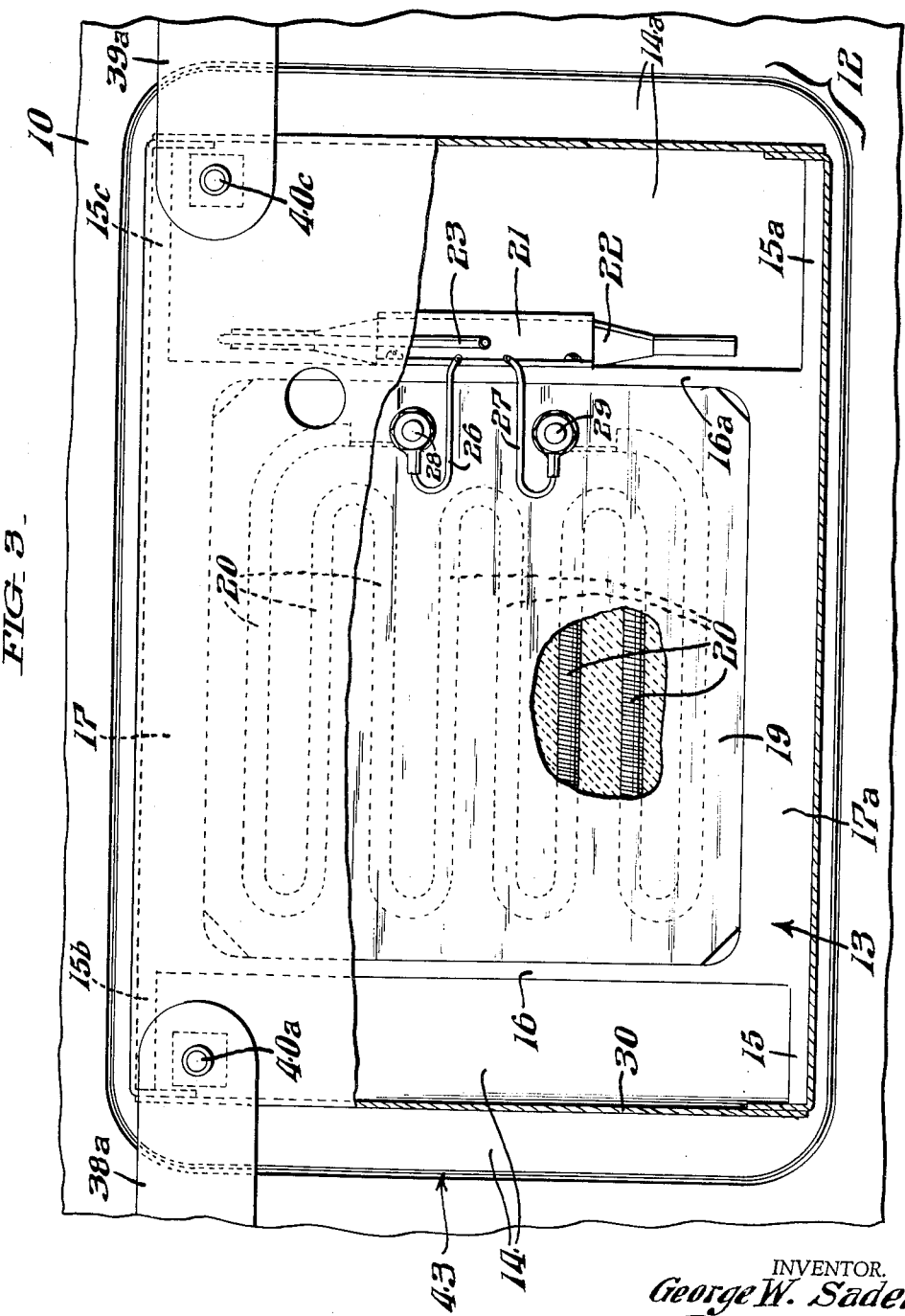

United States Patent Office 3,025,378
Patented Mar. 13, 1962

3,025,378
HEAT SEALING DEVICE HAVING PORCELAIN HEAT SURFACE
George W. Sadell, West Bristol, Pa., assignor to J. B. Dove & Sons, Inc., Philadelphia, Pa., a corporation of Pennsylvania
Filed Sept. 22, 1959, Ser. No. 841,504
1 Claim. (Cl. 219—19)

This invention relates to sealing of thermoplastic films. More particularly, this invention relates to an improved sealing apparatus and method for the heat sealing of thermoplastic films, such as pliofilm, polyethylene, saran, and the like.

It is well known that thermoplastic films of many different kinds are widely used as containers, in the form of bags, sacks, and the like for a great variety of articles sold in the ordinary channels of commerce. Owing to the property generally possessed by the majority of such plastic films of a low transmission of moisture vapor, they have been found particularly useful in connection with the packaging of materials which it is desired to keep moist and "fresh" by the retainment in such materials of the moisture content thereof. The utilization of plastic film for such purposes necessitates an efficient and economical method of effecting a hermetic seal thereof, the commonest of which involves the application of heat to the open edges of the container, thereby causing the film to become soft and sticky at the point of application, with the result that the aforesaid edges adhere to each other. Considerable difficulty has been encountered, however, in the use of conventional heat sealing apparatus to effect a seal in the manner aforedescribed owing to the tendency of the thermoplastic film to adhere to the surface of the heating element to which the edges of the container are applied in order to effect the desired bond. In the past in order to accomplish effective heat sealing of some thermoplastic materials, it has frequently been the practice to interpose between said materials and the heating element a film of "noncompatible" material, i.e., a film of material which will adhere neither to the thermoplastic film nor to the heating element. The foregoing expedient has proven unsatisfactory, however, since it necessarily slows down and renders considerably more costly the entire heat-sealing operation.

Accordingly, it is an object of this invention to provide an apparatus and method for the heat-sealing of thermoplastic film, whereby the tendency of said film to adhere to the contact element of the heat-scealing apparatus is avoided and whereby the necessity for the interposition of a non-adhering film between said contact element and said thermoplastic film is entirely eliminated.

It is another object of this invention to provide an apparatus and method for the heat-sealing of thermoplastic films whereby there is produced a sealed edge that is both clean and undistorted.

It is another object of this invention to provide an apparatus and method for the heat-sealing of thermoplastic films whereby the contact element of said apparatus remains clean and non-sticky during the heat-sealing operation, thereby eliminating the necessity for frequent interruption of the sealing operation in order to clean the apparatus.

Other objects and attendant advantages will become apparent hereinafter and in the drawings wherein:

FIG. 2 is a view in cross-section of the heat-sealing apparatus as constructed according to this invention taken as indicated by the lines and arrows II—II of FIG. 1.

FIG. 3 is a bottom view, partly broken away, of the heat-sealing apparatus illustrated in FIG. 2.

FIG. 4 is a diagrammatic representation of the wiring system of the heat sealing apparatus as provided in accordance with this invention.

Figure 1:
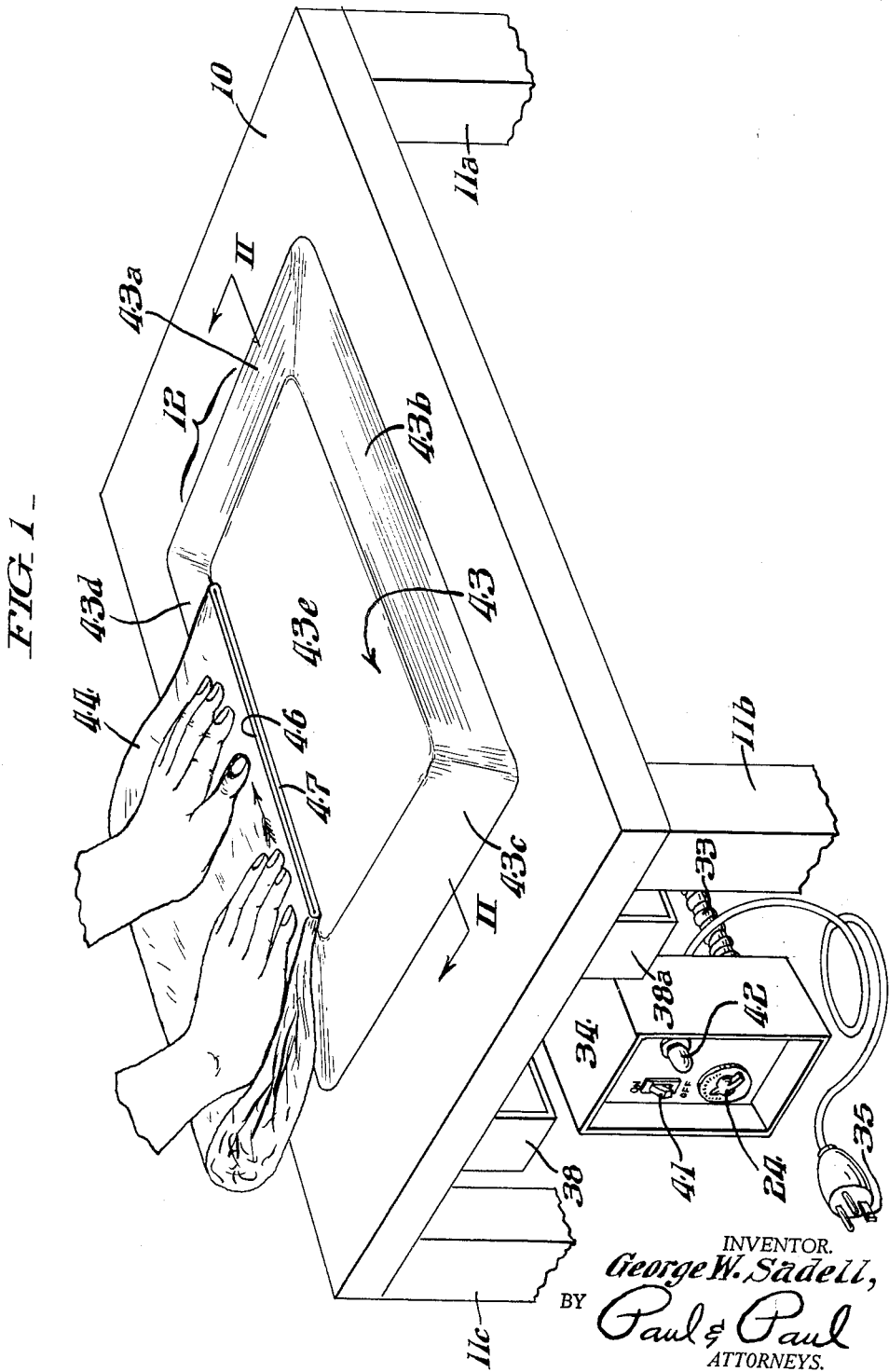
FIG. 1 is a view in perspective of the heat sealing apparatus as constructed according to this invention illustrating one specific mode of use thereof.

The following description is directed to the specific form of the invention as illustrated in the drawings and is not intended to be addressed to the scope of the invention as exemplified thereby. It will be appreciated that the drawings represent preferred embodiments of the invention which is capable of being practiced in a wide variety of forms and arrangements.

Adverting herewith to the specific form of the invention illustrated in the drawings, the numeral 10 designates the top of a table or frame having its surface in a horizontal plane and supported by legs 11a, 11b, and 11c. Positioned centrally of the rectangular top 10 is a raised heating element 12 also of generally rectangular proportion which seats within a cut-out rectangular space provided for that purpose in the central part of the top 10. As may best be seen in FIG. 2, the raised heating element 12 comprises a cast iron plate 13 having slanting sides 14 and 14a and having a depending flange portion of anvil-like shape at the bottom thereof consisting, in part, of the side flange portions 15 and 15a, and 15b and 15c and latitudinally extending central flange portions 16 and 16a. Positioned within the cavity formed by the depending latitudinal flange portions 16 and 16a and the longitudinal depending side flange portions 17 and 17a is a ceramic plate element 19 having embedded therein the heating coils 20. The ceramic plate element 19 is positioned so that its top surface is adjacent the bottom surface of the cast iron plate 13 and so that its side surfaces are adjacent the depending flange portions 16 and 16a, and 17 and 17a. Adjacent the opposite side of the depending flange portion 16a and supported by the angle 21 is a thermostat tube 22 which contains a fluid for causing a pressure change which is transmitted through a tube 23 to an indicating and controlling mechanism 24. As may best be seen in FIG. 3, electric current is transmitted from a power source (not shown) to the heating coils 20 by means of electric current carrying lines 26 and 27 which lead into the terminals 28 and 29 at the bottom of the ceramic plate element 19. A housing 30 of generally rectangular proportion positioned adjacent the undersurface of the cast iron plate 13 encloses the depending flanges of the aforesaid cast iron plate together with the ceramic plate element 19 and heating coils 20 adjacent thereto, as well as the thermostat bulb 22 and its supporting angle 21. Extending through the bottom surface of the housing 30 through an orifice provided for that purpose is a connector fitting 32 through which the electric lines 26 and 27 pass to the exterior of the housing and lead into an armored cable 33 to a power source (not shown). The thermotube 23 likewise passes through the fitting 32 and is carried through the armored cable 33 to the indicating and controlling mechanism 24. The armored cable 33 leads directly into a terminal box 34 from which there also leads a ground wire 35. The lines 26 and 27 are formed of nickel wire and insulated by asbestos sheathings 36 and 37. Supports 38, 38a, 39 and 39a are provided at the undersurface of the horizontal top of the table or frame 10 for the support of the housing 30 and the cast iron plate 13. To the housing 30 there are attached screws 40, 40a, 40b, and 40c through holes provided for that purpose in the bottom thereof which are tightly screwed into threaded holes in the supports 38, 38a, 39 and 39a, as may be seen in FIG. 2. The terminal box 34 is provided with an off and on switch 41 and an indicator light 42.

Adjacent the top and side surfaces of the cast iron plate 13 there is provided a layer of porcelain 43 of relatively small thickness when compared to the iron plate 13. As may be seen in FIG. 1, the top surface of the porcelain layer 43 presents the slanted surfaces 43a, 43b, 43c, and 43d at the sides thereof and the horizontal surface 43e at the top thereof. FIG. 1 further shows a thermoplastic bag 44 positioned for heat sealing in a manner to be more fully described hereinafter.

Ordinarily in the practice of this invention when it is desired to seal the open edges of a thermoplastic film, such as that comprising the container 44 shown in FIG. 1, the edges are placed adjacent the smooth flat porcelain surface 43d and kept pressed gently against said surface so that the heated porcelain surface causes the edges 46 and 47 to melt, become sticky, and adhere to each other. The bag and the edges to be sealed are then slid off the smooth porcelain surface at one side or another of the raised heating element as indicated by the arrow in FIG. 1.

It will be apparent that it is a principal advantage of this invention that by means of the porcelain covered heating element provided therein a great variety of thermoplastic films such as pliofilm, polyethylene, saran, cellophane, and the like, may be sealed in the manner aforedescribed without the interpositioning of a non-adhering film between the heating element and the edges of the thermoplastic film to be sealed.

It is still another advantage that the porcelain heating element therein provides a smooth non-adhering surface for a variety of thermoplastic films which may be used in continuous production without becoming unclean, sticky, and the like, thereby avoiding continual delays caused by the interruption of the sealing operation to clean the surface of the heating element.

Another important advantage of this invention is realized in the manner in which the porcelain covered heating element as provided herein effects a clean, non-sticky and non-ragged sealed edge, whereby the appearance of containers and the like sealed thereby is considerably enhanced.

Although this invention has been disclosed with reference to specific forms and embodiments thereof, it will be evident that a great number of variations may be made without departing from the spirit and scope of the invention. For example, parts may be reversed, equivalent elements may be substituted for those specifically disclosed and certain features of the invention may be used independently of other features, all without departing from the spirit and the scope of this invention as defined in the appended claims.

Having thus described my invention, I claim:

An apparatus for the heat sealing of thermoplastic film comprising a support frame, a metal plate carried by said frame, said plate having a top surface of porcelaneous material, said plate having an anvil-shaped, depending flange formed integrally therewith, a ceramic plate element encompassed by said flange and positioned adjacent the undersurface of said metal plate, said ceramic plate having embedded therein a plurality of electric resistance coils, means for conducting electric current to said coils, and control means connected to said current conducting means for turning on and off said electric current, said control means including a bulb positioned adjacent said flange, said bulb containing a fluid for producing a pressure change upon a change of temperature thereof, a connecting tube for transmitting said pressure change, and switch means connected to said tube for turning on and off said electric current in response to said pressure change.

References Cited in the file of this patent

UNITED STATES PATENTS

| | | |
|---|---|---|
| 1,590,286 | Davis | June 29, 1926 |
| 2,086,477 | Restel | July 6, 1937 |
| 2,421,373 | Cozza | June 3, 1947 |
| 2,445,086 | Rodwick | July 13, 1948 |
| 2,465,310 | Irwin | Mar. 22, 1949 |
| 2,577,183 | Denton | Dec. 4, 1951 |
| 2,583,705 | Peterson | Jan. 29, 1952 |
| 2,611,850 | Walton | Sept. 23, 1952 |
| 2,698,273 | Miner et al. | Dec. 28, 1954 |
| 2,726,707 | Wellons et al. | Dec. 13, 1955 |